United States Patent [19]
Downey et al.

[11] Patent Number: 6,092,873
[45] Date of Patent: Jul. 25, 2000

[54] SINGLE MANUAL LOCK CONFIGURATION FOR A SEAT ASSEMBLY

[75] Inventors: Hugh D. Downey, Barrie; Pascal Garrido, Gravehurst; Roger Freund, Port Sydney, all of Canada; Nills O. Olsson, Glen Ellyn, Ill.

[73] Assignee: Dura Automotive Proporties, Inc., Rochester Hills, Mich.

[21] Appl. No.: 09/207,331

[22] Filed: Dec. 8, 1998

[51] Int. Cl.⁷ ...................................................... A47C 1/02
[52] U.S. Cl. .................................. 297/344.1; 297/216.1; 248/429
[58] Field of Search ............................ 297/344.1, 452.18, 297/216.1, 311; 248/429, 430

[56] References Cited

U.S. PATENT DOCUMENTS

| | | |
|---|---|---|
| 1,877,769 | 9/1932 | Knapp . |
| 2,660,223 | 11/1953 | Appleton . |
| 3,124,332 | 3/1964 | Heyl, Jr. . |
| 4,432,524 | 2/1984 | Wize . |
| 4,623,114 | 11/1986 | Nishino . |
| 5,232,264 | 8/1993 | Hoshihara . |
| 5,244,178 | 9/1993 | Stewart . |
| 5,318,341 | 6/1994 | Griswold et al. . |
| 5,509,631 | 4/1996 | De Salvo . |

*Primary Examiner*—Milton Nelson, Jr.
*Attorney, Agent, or Firm*—Robert K. Roth

[57] ABSTRACT

A vehicle seat assembly includes a seat back supported with respect to a seat bottom and is attached to the vehicle by a mounting assembly. The mounting assembly has an inboard track assembly and an outboard track assembly that are both mounted to a vehicle structure with the track assemblies being spaced apart from one another. Each track assembly includes a first track and a second track supported for movement relative to the first track. The seat bottom is supported on the second track for horizontal movement with the second track as seat position is adjusted. A single locking mechanism is supported on one of the inboard or outboard track assemblies. The locking mechanism moveable between a locked position where the locking mechanism maintains the second track in a selected position relative to the first track and an unlocked position where the second track is moves with respect to the first track to a desired seat position. The mounting assembly further includes a manual actuator for selectively moving the locking mechanism between the locked and unlocked positions. A truss structure extends between the inboard and outboard track assemblies to provide structural support for the seat assembly.

20 Claims, 2 Drawing Sheets

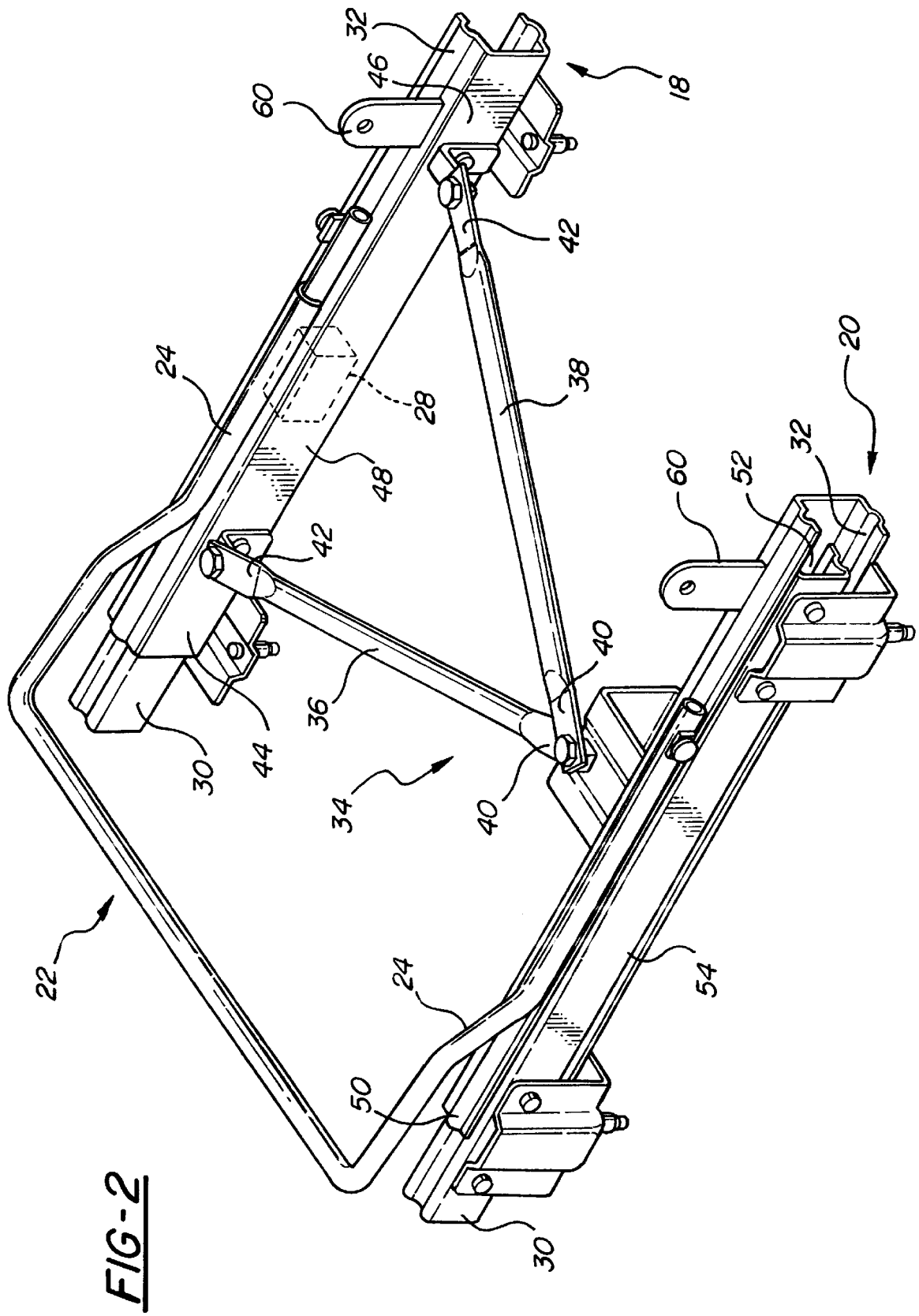

SINGLE MANUAL LOCK CONFIGURATION FOR A SEAT ASSEMBLY

BACKGROUND OF THE INVENTION

This application relates generally to a single locking mechanism used in a manual seat adjuster that provides a stable seat mount due to the use of a truss structure extending between seat track assemblies.

Seat track arrangements for mounting seats within vehicles are generally well known. Most arrangements provide for a seat to be moved or adjusted in forward and rearward directions within a vehicle along inboard and outboard track assemblies. The inboard track assembly is spaced apart from the outboard track assembly and both track assemblies include a first track member that is mounted to the vehicle and a second track member that is supported for movement relative to the first track member. The seat is adjusted in forward and rearward directions by sliding the second track members relative to the first track members.

Known inboard and outboard track assemblies for manual seat adjusters each include a locking assembly. These locking assemblies are moved between a locked position where the locking assemblies maintain the second tracks in a selected position relative to the first tracks and an unlocked position where the second tracks move with respect to the first tracks to a place the seat in a desired position. A manual actuator such as a handle or towel bar is used to move the locking assemblies from the locked position to the unlocked position.

One disadvantage of having two locking assemblies, one mounted on the inboard track assembly and one mounted on the outboard track assembly, is that the locking assemblies are not synchronized, i.e., one locking assembly will lock into place before the other, which is undesirable. When not synchronized, one of the locking assemblies locks into place, the other locking assembly remains unlocked between two increments. There is free play between the locking assemblies and the tracks to allow the "unlocked" locking assembly to move in either a forward or rearward position until it also locks into place. This results in a loose fitting between the locking assemblies and the tracks which causes to seat to rock resulting in seat instability and noise, which is undesirable.

Additionally, using two locking assemblies takes up more packaging space underneath the seat and increases the number of parts for the seat adjuster, which increases cost and assembly time.

Accordingly, it is desirable to provide a manual seat adjuster that only has one locking mechanism mounted to one of the track assemblies yet provides a seat mount that is stable and quiet. It is also desirable to only use one locking assembly so that the seat adjuster is lighter, uses less components, is less expensive and increases available packaging space.

SUMMARY OF THE INVENTION

In general terms, a vehicle seat includes a seat bottom supported on mounting assembly that has a manual seat adjuster for selectively moving the seat in a horizontal direction with respect to the vehicle. The mounting assembly includes an inboard track assembly that is spaced apart from an outboard track assembly. A single locking mechanism is mounted to one of the track assemblies. A truss structure extends between the two track assemblies to provide a stable seat mount.

The subject invention offers several advantages over prior art systems because it provides manual seat adjuster that only uses a single locking mechanism while still providing a rigid and stable seat assembly by utilizing a truss system extending between track assemblies. The subject invention also decreases the number of components and is lighter and less expensive than prior art assemblies.

These and other features and advantages of the present invention will be best understood from the following specification and drawings, the following of which is a brief description.

BRIEF DESCRIPTION OF THE DRAWINGS

FIG. 2 is an enlarged perspective view of the seat track mounting assembly shown schematically in FIG. 1.

DETAILED DESCRIPTION OF THE PREFERRED EMBODIMENT

Figure 1:
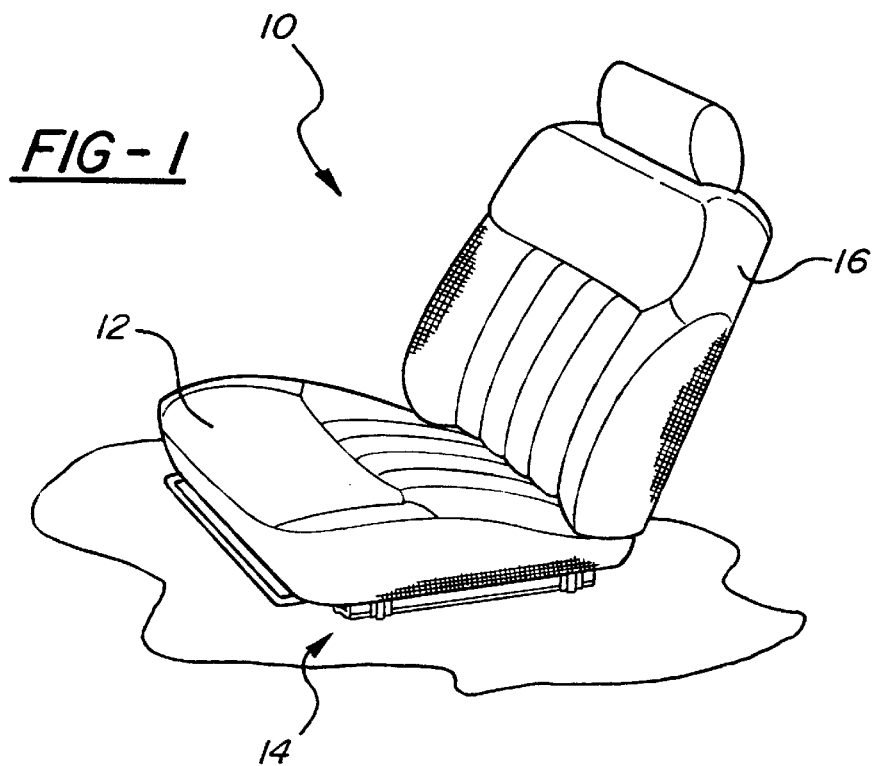
FIG. 1 is a perspective illustration of a seat with a seat track mounting assembly including the inventive locking mechanism and truss structure.

FIG. 1 illustrates a vehicle seat assembly 10. The seat assembly 10 includes a seat bottom 12 that is mounted within the vehicle on a mounting assembly 14. A seat back 16 is supported with respect to the seat bottom 12.

The mounting assembly 14 includes track assemblies on an inboard side 18 and an outboard side 20 of the seat assembly 10. An actuator mechanism, such as a handle or towel bar 22, is accessible by a seat occupant and is operably connected to both the inboard 18 and outboard 20 track assemblies. Optionally, the handle or towel bar 22 could be mounted to only one of the track assemblies 18, 20. The terms inboard and outboard are used in this description for clarity and illustration purposes only and cannot be considered limiting.

As shown in FIG. 2, the towel bar 22 is a generally C-shaped member with two leg portions 24 interconnected by a central portion 26. One leg portion 24 is connected to a locking mechanism 28 supported by one of the inboard 18 or outboard 20 track assemblies. The other leg portion 24 is pivotally mounted to the other of the inboard 18 or outboard 20 track assemblies. The central portion 26 is adjacent to the front of the seat bottom 12 and serves as the handle that is actuated by a seat occupant. When the central portion 26 is lifted upwardly toward the seat bottom 12, the leg portion 24 mounted to the locking mechanism 28 moves the locking mechanism 28 from the locked position to the unlocked position and thus, allow the seat 20 to be adjusted forwardly or rearwardly.

The inboard 18 and outboard 20 track assemblies are spaced apart from one another and each include a first track 30 and a second track 32. Preferably, the first track 30 is a lower or outer track that is fixedly mounted to a frame of the vehicle, for example. The second track 32 is preferably an upper or inner track that is supported with respect to the lower track 30 so that the upper track 32 can be moved in a forward or rearward direction relative to the lower track 30. The terms inner, outer, forward, rearward, upper, and lower, as used in this description, are for illustration purposes only and cannot be considered limiting.

As discussed above, the locking mechanism 28 is supported on one of the inboard 18 or outboard 20 track assemblies and is moveable between a locked position where the locking mechanism 28 maintains the seat 10 in a desired position and an unlocked position where seat position can be adjusted by moving the second inboard and outboard track members 32 relative to the first inboard and outboard track members 30, respectively.

In order to provide a securely locked and stable seat, the mounting assembly 14 includes a rigid structural assembly, shown generally at 34, that extends between the inboard 18 and outboard 20 track assemblies. The assembly 34 can include structural members supported by the track assemblies 18, 20 or can be formed as part of the seat pan. The use of the rigid structural assembly 34 allows a single locking mechanism 28 to be used for the seat mounting assembly 14 while still providing a stable seat.

Figure 3:
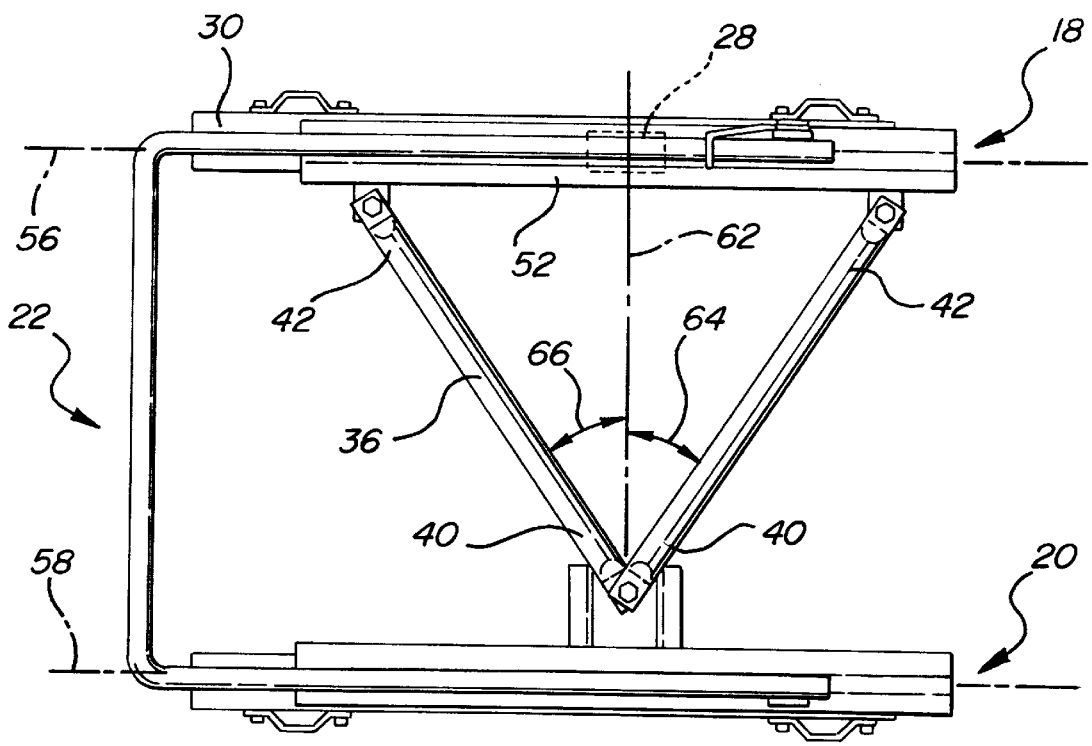
FIG. 3 is a top view of the mounting assembly shown in FIG. 2.

The locking mechanism 28 is shown schematically in FIGS. 1–3. The locking mechanism 28 can be any of various locking mechanisms known in the art, including but not limited to locking mechanisms that have locking members that are pins, teeth, gears, fingers, or tabs that move between locked and unlocked positions. The locking mechanism can be actuated so that the locking members are linearly moved from the locked to the unlocked position or can be actuated such that the locking members are rotated out of the locked position and into the unlocked position. The locking mechanism must have the capability of preventing relative movement between the first 30 and second 32 tracks and must also include structure for allowing the mechanism 28 to be selectively moved from the locked position to the unlocked position. As discussed above, an actuator 22 is used by the seat occupant to selectively move the locking mechanism 28 between the locked and unlocked positions.

The rigid structural assembly 34 includes at least one cross piece that extends between the inboard 18 and outboard 20 tracks to provide a strong and stable mount as seat position is adjusted. As shown in FIG. 2, the rigid structural assembly 34 is preferably comprised of a first cross piece 36 and a second cross piece 38. The first 36 and second 38 cross pieces each have a first end 40 supported near a center portion of one of the inboard 18 or outboard 20 track assemblies and a second end 42 supported near an end portion of the other of the inboard 18 or outboard 20 track assemblies.

As discussed above, the rigid structural assembly 34 can include separate cross pieces members 36, 38, or the cross pieces members can be integrally formed together. For example, the first and second cross pieces can be integrally formed as one piece having a center portion mounted near the center of one of the track assemblies with a first leg portion 36 extending toward an end of the other track and a second leg portion 38 extending toward an opposite end of the other track.

The locking mechanism 28 is preferably mounted on the inboard track assembly, thus, the following description will be directed to this configuration. However, it should be understood that the locking mechanism 28 could also be mounted on the outboard track assembly 20.

The inboard track assembly 18 has first end portion 44 and a second end portion 46. The locking mechanism 28 is preferably mounted near a center portion 48 of the inboard track assembly 18 between the first 44 and second 46 end portions. The outboard track assembly has a first end portion 50, a second end portion 52, and a center portion 54 midway between the first 50 and second 52 end portions. The first ends 40 of the first 36 and second 38 cross pieces are preferably mounted near the center portion 54 of the outboard track assembly. The first cross piece 36 preferably has the second end 42 mounted near the first end portion 44 of the inboard track assembly 18 while the second cross piece 38 preferably has the second end 42 mounted near the second end portion 46 of the inboard track assembly. This mounting configuration provides a stable seat mount and eliminates the rocking and vibration noise inherent in prior art seat mounts with two locking mechanisms, one installed in each track assembly.

The inboard track assembly 18 defines an inboard longitudinal axis 56 and the outboard track assembly 20 defines an outboard longitudinal axis 58. The inboard 56 and outboard 58 longitudinal axes are spaced apart from one another and are generally parallel. The second tracks 32 move with respect to the first tracks 30 along the respective longitudinal axis 56, 58 when the locking mechanism 28 is in the unlocked position.

The rigid structural assembly 34 includes at least one component that is mounted transversely to the inboard 56 and outboard 58 longitudinal axes. As described above, the rigid structure assembly 34 includes at least two cross pieces 36, 38 that extend between the track assemblies 18, 20. The cross pieces 36, 38 are mounted at an angle with respect to the inboard 56 and outboard 58 longitudinal axes. While two cross pieces 36, 38 are shown, it should be understood that more than two cross pieces could be used in the rigid structure assembly 34 to provide additional support.

Some seat assemblies 10 also include a seat belt assembly (not shown) that is supported solely by the seat assembly 10. A seat occupant who is belted into the seat assembly will exert a force on the seat assembly when the occupant experiences a deceleration load. This is known as an "all belts to seat" load. This seat load is transferred to the mounting assembly 14. Thus, the mounting assemblies 14 must be strong enough to securely hold the seat assembly in place and prevent the seat 10 from separating from the vehicle during a sudden deceleration.

Another advantage of using the single locking mechanism 28 with the rigid structural assembly 34 is that the mounting assembly 14 can accommodate "all belts to seat" loading. As shown in FIG. 2, at least one seat belt bracket 60 can be mounted to one of the inboard 18 or outboard 20 track assemblies. The track assemblies 18, 20 are strong enough to handle the load transferred through the seat belt bracket 60. While the mounting assembly 14 can be used in an "all belts to seat" configuration, the mounting assembly with the single locking mechanism 28 and the rigid structural assembly 34 can also be used in other seat belt mounting configurations.

The rigid structural assembly 34 is a truss structure that extends between the inboard 18 and outboard 20 track assemblies to provide structural support for the seat assembly 10. As shown in FIG. 3, the inboard 18 and outboard 20 track assemblies define a central horizontal axis 62 that is generally perpendicular to the inboard 56 an outboard 58 longitudinal axes and extends between the center portions 48, 54 of the inboard 18 and outboard 20 track assemblies.

The first 36 and second 38 cross pieces of the truss structure include first ends 40 supported on one of the track assemblies 18, 20 adjacent to an intersection of the horizontal axis 62 with the inboard 56 or outboard 58 longitudinal axis. The first cross piece 36 is mounted at a first angle 64 with respect to the horizontal axis 62 and the second cross piece 38 is mounted at a second angle 66 with respect to the horizontal axis 62. Preferably the first 36 and second 38 cross pieces are mounted such that the first 64 and second 66 angles are equal.

The subject invention provides a manual seat adjuster that uses only one locking mechanism 28 mounted to one of the track assemblies 18 or 20 yet provides a seat mount that is stable and quiet. The use of only one locking mechanism 28 also makes the seat adjuster is lighter by using fewer components, which makes the adjuster less expensive and increases available packaging space underneath the seat.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An apparatus for mounting a seat within a vehicle comprising, in combination:
    an inboard track assembly including a first inboard track member mounted to a vehicle structure and a second inboard track member supported for movement relative to said first inboard track member;
    an outboard track assembly spaced apart from said inboard track assembly and including a first outboard track member mounted to the vehicle structure and a second outboard track member supported for movement relative to said first outboard track member;
    a locking mechanism directly mounted on one of the second inboard track member or the second outboard track member, and moveable between a locked position where said locking mechanism maintains a seat in a desired position and an unlocked position where seat position can be adjusted by moving said second inboard and outboard track members relative to said first inboard and outboard track members, respectively; and
    a rigid structural assembly extending between said inboard and outboard track assemblies for providing stability, comprising a first cross piece and a second cross piece, said first and second cross pieces each having a first end supported near a center portion of one of said inboard or outboard track assemblies opposite the locking mechanism and a second end supported near an end portion of the other of said inboard or outboard track assemblies, such that the locking mechanism is positioned between the second end of the first cross piece and the second end of the second cross piece.

2. An apparatus as recited in claim 1 including an actuator for selectively moving said locking mechanism between said locked and unlocked positions.

3. An apparatus as recited in claim 2 wherein said actuator is a handle connected to said locking mechanism, said handle being manually actuated for moving said locking mechanism from said locked position to said unlocked position.

4. An apparatus as recited in claim 1 wherein said second end of said first cross piece is supported near a front end portion of the other of said inboard or outboard track assemblies and said second end of said second cross piece is supported near a rear end portion of the other of said inboard or outboard track assemblies.

5. An apparatus as recited in claim 1 wherein said inboard and outboard track assemblies define inboard and outboard longitudinal axes, respectively, and wherein said rigid structural assembly is comprised of at least one cross piece member having at least one portion mounted at an angle with respect to said inboard and outboard longitudinal axes.

6. An apparatus as recited in claim 5 wherein said cross piece has a first mounting portion supported adjacent to a center of one of said inboard or outboard track assemblies, a second mounting portion located adjacent to an end of the other of said inboard or outboard track assemblies, and a third mounting portion located adjacent to an opposite end of the other of said inboard or outboard track assemblies.

7. An apparatus for mounting a seat within a vehicle comprising, in combination:
    an inboard track assembly defining an inboard longitudinal axis;
    an outboard track assembly defining an outboard longitudinal axis spaced apart from and generally parallel to said inboard longitudinal axis;
    a locking mechanism mounted on one of said inboard or outboard track assemblies and moveable between a locked position where said locking mechanism maintains a seat in a desired position and an unlocked position where seat position can be adjusted; and
    at least one rigid member extending between said inboard and outboard track assemblies and being mounted at a non-perpendicular angle with respect to said inboard and outboard longitudinal axes, said rigid member for stabilizing said inboard and outboard track assemblies, said rigid member comprising a first cross piece and a second cross piece, said first and second cross pieces each having a first end mounted together to one of said inboard and or outboard track assemblies opposite the locking mechanism and a second end supported near an end portion of the other of said inboard or outboard track assemblies, such that a horizontal axis is defined as being perpendicular to the inboard and outboard longitudinal axes and extending between the locking mechanism and the first ends of the first and second cross pieces.

8. An apparatus as set forth in claim 7 wherein said inboard track assembly includes a first inboard track member mounted to a vehicle structure and a second inboard track member supported for movement relative to said first inboard track member and said outboard track assembly includes a first outboard track member mounted to the vehicle structure and a second outboard track member supported for movement relative to said first outboard track member, said rigid member being mounted to said second inboard and outboard track members.

9. An apparatus as set forth in claim 7 including at least one seat belt bracket supported by one of said inboard or outboard track assemblies wherein said rigid member provides increased structural stability when a seat load is transferred to said inboard and outboard track assemblies via said seat belt bracket.

10. An apparatus for mounting a seat within a vehicle comprising, in combination:
    an inboard track assembly defining an inboard longitudinal axis and including a first inboard track member and a second inboard track member supported for movement relative to said first inboard track member;
    an outboard track assembly defining an outboard longitudinal axis spaced apart from and generally parallel to said inboard longitudinal axis and including a first outboard track member and a second outboard track member supported for movement relative to said first outboard track member;
    a locking mechanism directly mounted on one of the second inboard track member or the second outboard track member, and moveable between a locked position where said locking mechanism maintains a seat in a desired position and an unlocked position where seat position can be adjusted; and a rigid structural assembly extending between said inboard and outboard track assemblies, comprising a first cross piece and a second cross piece, said first and second cross pieces each having a first end supported near a center portion of one of said inboard or outboard track assemblies opposite the locking mechanism and a second end supported near an end portion of the other of said inboard or outboard track assemblies, such that the locking mechanism is positioned between the second end of the first cross piece and the second end of the second cross piece.

11. An apparatus as recited in claim 10 wherein said locking mechanism is mounted to said inboard track assembly between forward and rearward end portions.

12. An apparatus as recited in claim 10 including a manual actuator for selectively moving said locking mechanism from said locked to said unlocked position.

13. An apparatus as recited in claim 10 including at least one seat belt bracket supported by one of said inboard or outboard track assemblies.

14. A vehicle seat assembly comprising, in combination:

a seat bottom;

an inboard track assembly mounted to a vehicle structure;

an outboard track assembly mounted to a vehicle structure and spaced apart from said inboard track assembly;

said inboard and outboard track assemblies each including a first track and a second track supported for movement relative to said first track, said seat bottom being supported on said second track for horizontal movement with said second track;

a single locking mechanism supported on one of said inboard or outboard track assemblies and moveable between a locked position where said locking mechanism maintains said second track in a selected position relative to said first track and an unlocked position where said second track moves with respect to said first track to a desired seat position;

a manual actuator for selectively moving said locking mechanism between said locked and unlocked positions pivotably mounted on both the inboard and outboard track assemblies;

a truss structure extending between said inboard and outboard track assemblies for providing structural support for the seat assembly, the truss structure comprising a first cross piece and a second cross piece, said first and second cross pieces each having a first end supported near a center portion of one of said inboard and or outboard track assemblies opposite the locking mechanism and a second end supported near an end portion of the other of said inboard or outboard track assemblies, such that the manual actuator pivots about a pivot axis located between the second end of the first cross piece and the second end of the second cross piece.

15. An assembly as recited in claim 14 wherein said inboard track assembly defines an inboard longitudinal axis and said outboard track assembly defines an outboard longitudinal axis that is spaced apart from and generally parallel to said inboard longitudinal axis.

16. An assembly as recited in claim 15 wherein said truss structure includes at least one component mounted at an angle with respect to said inboard and outboard longitudinal axes.

17. An assembly as recited in claim 15 wherein said inboard and outboard track assemblies define a central horizontal axis that is perpendicular to said inboard and outboard longitudinal axes, and wherein the fist ends of said first and second cross pieces are supported on one of said inboard and outboard track assemblies adjacent to an intersection of said horizontal axis with said inboard or outboard longitudinal axis.

18. An assembly as recited in claim 17 wherein said first cross piece is mounted at a first angle with respect to said horizontal axis and said second cross piece is mounted at a second angle with respect to said horizontal axis.

19. A seat assembly as recited in claim 18 wherein said first and second angles are equal.

20. A seat assembly as recited in claim 15 wherein said truss structure further comprises a first mount supported near one of said inboard and outboard track assemblies and a pair of second mounts supported by the other of said inboard or outboard track assemblies.

* * * * *